(12) United States Patent
Akel (10) Patent No.: US 11,817,087 B2
(45) Date of Patent: Nov. 14, 2023

(54) SYSTEMS AND METHODS FOR REDUCING LATENCY IN CLOUD SERVICES

(71) Applicant: Micron Technology, Inc., Boise, ID (US)

(72) Inventor: Ameen D. Akel, Rancho Cordova, CA (US)

(73) Assignee: Micron Technology, Inc., Boise, ID (US)

( * ) Notice: Subject to any disclaimer, the term of this patent is extended or adjusted under 35 U.S.C. 154(b) by 48 days.

(21) Appl. No.: 17/006,157

(22) Filed: Aug. 28, 2020

(65) Prior Publication Data

US 2022/0068264 A1    Mar. 3, 2022

(51) Int. Cl.
| | |
|---|---|
| *G10L 15/16* | (2006.01) |
| *G10L 15/30* | (2013.01) |
| *G10L 15/22* | (2006.01) |
| *G06F 16/635* | (2019.01) |
| *G06N 3/08* | (2023.01) |

(52) U.S. Cl.
CPC ............ *G10L 15/16* (2013.01); *G06F 16/635* (2019.01); *G06N 3/08* (2013.01); *G10L 15/22* (2013.01); *G10L 15/30* (2013.01); *G10L 2015/221* (2013.01); *G10L 2015/223* (2013.01)

(58) Field of Classification Search
CPC ......... G10L 15/16; G10L 15/22; G10L 15/30; G10L 2015/221; G10L 2015/223; G06F 16/635; G06N 3/08
See application file for complete search history.

(56) References Cited

U.S. PATENT DOCUMENTS

| | | | | |
|---|---|---|---|---|
| 6,810,379 | B1 * | 10/2004 | Vermeulen | G10L 13/07 704/260 |
| 11,194,973 | B1 * | 12/2021 | Goel | G06F 40/35 |
| 2008/0167874 | A1 * | 7/2008 | Eide | G10L 15/22 704/E15.04 |
| 2011/0035222 | A1 * | 2/2011 | Schiller | G10L 13/00 704/260 |
| 2014/0058732 | A1 * | 2/2014 | Labsky | G10L 15/30 704/E15.005 |
| 2017/0161320 | A1 * | 6/2017 | Venkataraman | G06F 16/243 |
| 2020/0043478 | A1 | 2/2020 | Lee | |
| 2020/0074988 | A1 | 3/2020 | Park et al. | |
| 2020/0167384 | A1 * | 5/2020 | Aher | G10L 13/027 |
| 2021/0256057 | A1 * | 8/2021 | Zhang | G10L 13/04 |

FOREIGN PATENT DOCUMENTS

CN          110956962          4/2020

OTHER PUBLICATIONS

International Search Report and Written Opinion, PCT/US2021/046726, dated Dec. 10, 2021.

* cited by examiner

*Primary Examiner* — Bhavesh M Mehta
*Assistant Examiner* — Darioush Agahi
(74) *Attorney, Agent, or Firm* — Greenberg Traurig (57) ABSTRACT

Systems and methods for distributing cloud-based language processing services to partially execute in a local device to reduce latency perceived by the user. For example, a local device may receive a request via audio input, that requires a cloud-based service to process the request and generate a response. A partial response may be generated locally and played back while a more complete response is generated remotely.

14 Claims, 7 Drawing Sheets

SYSTEMS AND METHODS FOR REDUCING LATENCY IN CLOUD SERVICES

FIELD OF TECHNOLOGY

The present disclosure relates to using cloud-based services to process user input received at a client device.

BACKGROUND

Client devices may receive user input (e.g., via an audio interface such as a microphone). Users may speak to the client device and ask questions or submit commands. The client device may serve as a virtual assistant that receives these requests and plays back a response. For example, a user may ask for the time, ask for directions, request an internet search to be performed, or issue other commands. To process such requests, the client device may invoke a cloud-based service to process the request. For example, cloud-based services may apply various artificial intelligence algorithms to convert an audio input into text and process the text to extract and infer context. The cloud-based service may then generate a response that is transmitted to the client device. The client device may then present (e.g., play back) an audio output based on the response received from the cloud service. The use of cloud services to process requests may introduce a latency between the time a user finishes speaking and the time the user hears the cloud-generated audio output. The latency may be several seconds. The latency may provide a user experience that is less natural due to the delay between request and response.

BRIEF DESCRIPTION OF THE DRAWINGS

In order to facilitate a fuller understanding of the present invention, reference is now made to the attached drawings. The drawings should not be construed as limiting the present invention but are intended only to illustrate different aspects and embodiments.

DETAILED DESCRIPTION

Server applications may provide user assistance in response to requests. Users may request the services of the server application by communicating via speech or providing other user input (e.g., text-based input) to a client device. The client device then communicates with the server application. For example, a virtual assistant executing on a client device may trigger on a user input (e.g., user action, spoken word), send the contents of the user input to a server application (e.g., a cloud-hosted, remote inference engine), wait for a return response with the result of the query, and present the answer to the user. In many cases, this creates a perceptibly long pause in the face of network traffic and cloud inference load. Users may be frustrated by the slow responsiveness of the distributed virtual assistant.

Users do not often expect the content of the response in the millisecond-to-second timeframe required to perform the remote inference. However, user may expect some form of responsiveness in the meantime. One can assume that the latencies will often need to be in the conversational response time range (on the order of milliseconds; as if the user were speaking with another human).

The present disclosure is directed to reducing the latency between user input at the client device and a response generated by a server application. According to various embodiments, the solution involves implementing streamlined functionality in the client device to generate and provide an initial response while the server application generates the primary response. As the client device is presenting the initial response (e.g., playing a first audio clip) the primary response is generated by a cloud service and transmitted to the client device. The client device may then append a second audio clip associated with the primary response to a currently-playing first audio clip. From the user's perspective, the user observes a continuously played audio clip with minimal delay after providing user input. From the client device's perspective, the client device begins presenting the response to the user without having the complete response generated.

In some embodiments, the client device immediately replies to the user with an initial response made up of a first audio clip that is predefined. The predefined audio clip may be a boilerplate introductory response. This gives the impression of instant latency to the user, even though the query itself does not finish until sometime before the boilerplate response has finished playing. For example, if a user provides a request by speaking "What is 12+12?", the client device may immediately begin to reply a first audio clip that says. "The answer is . . . ". This "boilerplate" response requires 1-2 seconds to be articulated via voice response, which may provide sufficient time for a cloud-based inference request and response.

In other embodiments, the client device locally executes a relatively small, predictive Deep Neural Network (DNN). The local DNN may determine a directional marker for the actual answer. For example, user may get receive a positive or negative initial answer immediately, while the query is taking place in the background using the cloud service. For example, the local DNN may be configured for responding "Yes—I can get that answer for you" or "No—I don't believe I know that answer."

In other embodiments, the client device executes a relatively small predictive DNN to generate an initial response corresponding to a topic of the request. For example, if a user asks, "How is the weather today?", the local DNN may identify the topic as "weather" formulate an initial response of "Today, the weather will be . . . ". This occupies the few seconds required to perform the inference analysis on a remote, cloud service without any perceivable delay. The cloud service may then generate a primary response while the first clip is presented (e.g., played back). The client device may then append a second audio clip associated with the primary response to the first clip for seamless playback of a complete response.

Exemplary embodiments will now be described in order to illustrate various features. The embodiments described herein are not intended to be limiting as to the scope, but rather are intended to provide examples of the components, use, and operation of the invention.

Figure 1:
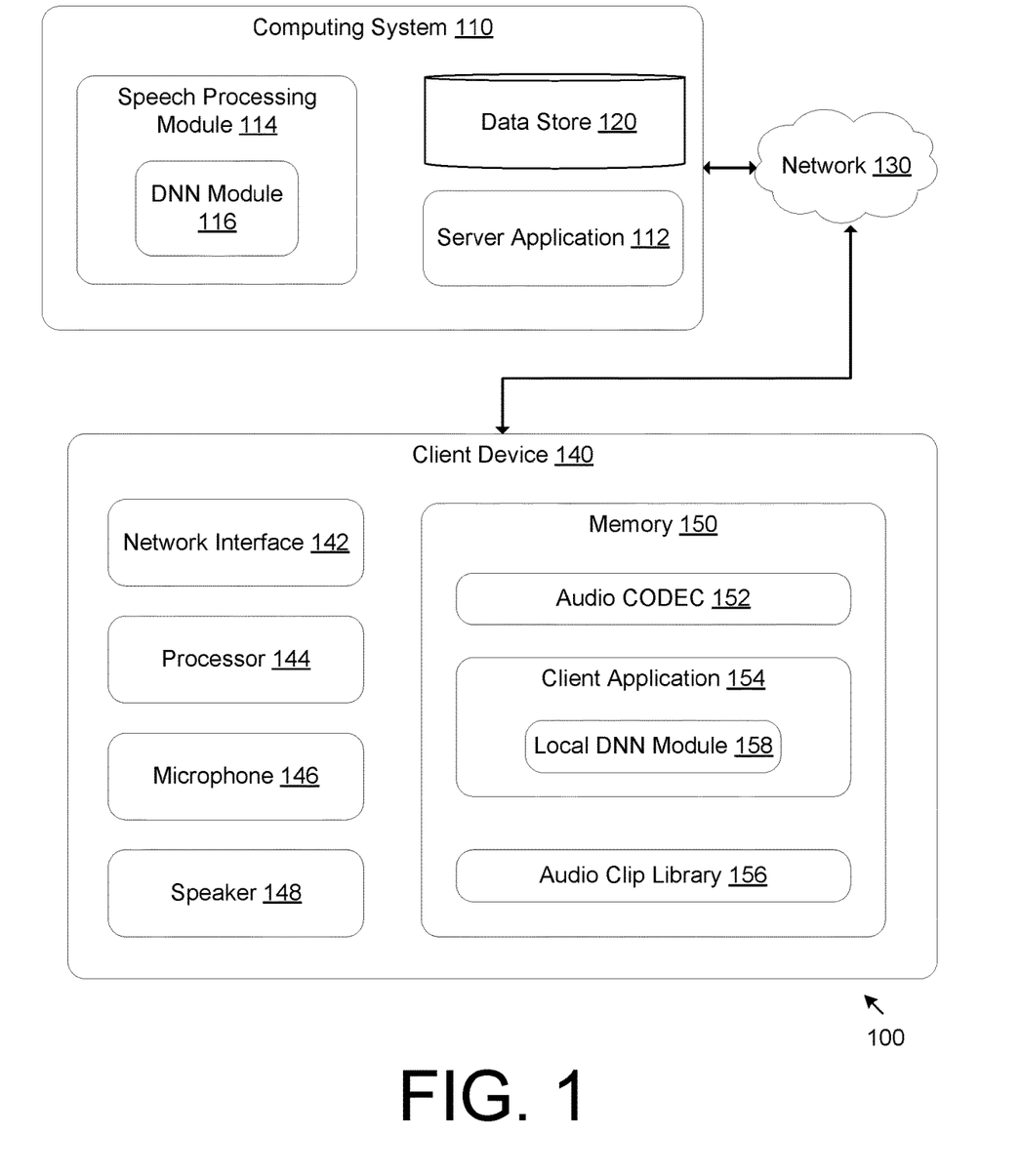
FIG. 1 is a drawing of a networked environment according to various embodiments.

FIG. 1 shows a networked environment 100 according to various embodiments. The networked environment 100 includes a computing system 110 that may execute application programs and store various data. The computing system 110 may be implemented as a server installation or any other system providing computing capability. Alternatively, the computing system 110 may employ a plurality of computing devices that may be arranged, for example, in one or more server banks or computer banks or other arrangements. Such computing devices may be located in a single installation or may be distributed among many different geographical locations. For example, the computing system 110 may include a plurality of computing devices that together may comprise a hosted computing resource, a grid computing resource, and/or any other distributed computing arrangement. In some embodiments, the computing system 110 may correspond to an elastic computing resource where the allotted capacity of processing, network, storage, or other computing-related resources may vary over time. The computing system 110 may implement one or more virtual machines that use the resources of the computing system 110 to execute server-side applications.

The computing system 110 provides a cloud service to users. The cloud service includes a remotely executed application that may draw inferences from user input and generate a response. This may involve analyzing speech-based user input, determine a query from the speech based input, execute the query, and return the results. The result may involve searching for data and formatting the data as a speech output. For example, if the user input is "what is the weather?", the cloud service may analyze this speech input to determine a specific query. The query, for example, may be to search a database for weather-related data based on the user's location. The query yields a response which may be, in this example, weather data for the user's location. The cloud service may generate an audio clip to express the data of the response and transmit the data of the response and/or the audio clip to the client device.

Specifically, the computing system includes a server application 112 that interfaces with a client device to provide cloud services to the client device. The server application 112 may be a server-side virtual assistant application. The server application 112 may be configured to perform data base queries, internet searches, functional calls, or other network commands to Web-based services to obtain the results of a query. Network commands used by the server application 112 may be implemented according to different technologies, including, but not limited to, Representational state transfer (REST) technology or Simple Object Access Protocol (SOAP) technology. REST is an architectural style for distributed hypermedia systems. A RESTful API (which may also be referred to as a RESTful web service) is a web service API implemented using HTTP and REST technology. SOAP is a protocol for exchanging information in the context of Web-based services.

The server application 112 may receive input from a client device, where the input requests data. The server application 112 then constructs a query to obtain the requested data. The server application 112 may interface with a speech processing module 114 to draw inferences from a speech-based input. For example, the input handled by the server application 112 may be audio data originating at a client device, where the audio data is speech indicating a request for information. To convert the speech into a search query, the server application 112 may pass the speech-based input to the speech processing module 114 to analyze the speech-based input.

The speech processing module 114 may include one or more artificial intelligence algorithms to process and analyze speech. For example, the speech processing module 114 may include a Deep Neural Network (DNN) module 116. The DNN module 116 may include an end-to-end trained system that converts a speech-based input (e.g., an audio input) to a series of textual word sequences. This allows the DNN module 116 to convert speech to text. In addition, the DNN module 116 may categorize or classify the text to draw inferences, meaning, and context of the speech-based input. The server application 112 may then convert the analyzed speech-to-text output of the DNN module 116 to generate a query.

The computing system 110 may include a data store 120. The data store 120 may store data, files, executable code, libraries, APIs, configuration data, and other data/executables to allow the application programs of the computing system 110 to execute. For example, the application programs of the computing system 110 may read data from the data store 120, write data to the data store 120, update, delete, or otherwise manipulate data in the data store 120.

The computing system 110 is coupled to a network 130. The network 130 may include networks such as the Internet, intranets, extranets, wide area networks (WANs), local area networks (LANs), wired networks, wireless networks, or other suitable networks, etc., or any combination of two or more such networks. The server application 112 may communicate with one or more client devices 140. In this respect, the computing system 110 and the client device 140 may be arranged in a client-server configuration. The client device 140 may communicate with the computing system 110 using a communication protocol such as, for example, Hyper Text Transport Protocol (HTTP).

A client device 140 may be a personal computing device, laptop, mobile device, smart phone, tablet, desktop, smart speaker, or other client device. The client device 140 may include various components such as, for example, a network interface 142, a processor(s) 144, a microphone, 146, a speaker 148, a memory 150, and potentially other components (e.g., a display, a touch screen, etc.). The network interface 142 may include a wireless radio that is configured to communicate over the network 130 with at least the computing system 110. The network interface 142 may include a cellular radio, a WiFi radio, or other hardware devices for communicating over the network 130.

The processor 144 is configured to execute instructions and carry out various operations and functionality of the client device 140. The processor 144 is discussed in greater detail with respect to FIG. 7. The microphone 146 is an audio sensor capable of receiving acoustic input and converting it to a corresponding electrical signal. The microphone 146 may be coupled to an analog-to-digital converter to generate digital samples of audio input. The microphone 146 captures a user's speech, where the speech is digitized into an audio input signal. The audio input signal may be received and processed by the processor 144. The speaker 148 is configured to output an audio output signal generated or otherwise provided by the processor 144. The speaker may convert an electrical signal into an acoustic wave that is heard by a user. The microphone 146 and speaker 148, thus provide an input/output user interface of the client device 140 to allow the user to interact with the client device 140.

The memory 150 represents one or more memory devices that include, for example, volatile and non-volatile memory. Program instructions may be stored in non-volatile memory and loaded in to volatile memory for execution by the processor 144. This is discussed in further detail with respect to FIG. 7. The memory 150 may store or load an audio codec 152, a client application 154, and an audio clip library 156. The audio codec 152 may be a computer program that compresses and/or decompresses digital audio data according to a particular audio coding format. For example, audio input signals generated by the microphone 146 may be formatted to a target coding using the audio codec 152. In addition, audio output signals may be formatted to a target coding format before outputted via the speaker 148.

The client application 154 may be a dedicated mobile application (e.g., an app), a browser, or other program. The client application 154 may execute as a user-level application on the operating system of the client device 140. In other embodiments, the client application 154 may be a service provided by the operating system of the client device 140. The client application 154 may be a virtual assistant application that receives user input and generates responsive output for the user. For example, the user may submit a request to the client application 154 such as a request for information (e.g., requests for information about the news, weather, sports, the time, etc.). The client application 154 may process the user input and invoke cloud services to generate a response, which is then relayed back to the user via the speaker 148. The client application 154 may be given access permissions to various input/output modules of the client device 140 including, for example, the microphone 146 and speaker 148. In this respect, a user may provide a speech-based input via the microphone that is received by the client application 154 as an audio input signal. The client application 154 may also generate audio output signals that are provided to the speaker 148. The client application 154 may use the audio codec 152 to handle audio signals received from the microphone 146 and outputted to the speaker 148. In this respect, the client application 154 may execute an audio playback command to cause the speaker 148 to play an output audio clip. For example, the client application 154 renders the audio clip for presentation via the speaker 148. This may involve sending an instruction to the operating system to play back audio.

In some embodiments, the client application 154 includes one or more locally executed Artificial Intelligence (AI) modules. An AI module may include supervised learning or unsupervised learning models. Supervised learning models use training data to build the AI model. Training data includes a dataset that is labeled. The label represents how a piece of data in the dataset should be classified. The supervised learning model learns from the labeled dataset to apply new labels to new datasets during run time. For example, the supervised learning model may build a decision tree using the training data to classify new datasets. Supervised learning models include, for example, Naïve Bayes, k-nearest neighbors (K-NN), support vector machine (SVM), Decision Trees, or Logistic Regression. Unsupervised machine learning models refer to artificial intelligence models that analyze input data, organize the data (e.g., clustering, grouping, linking data items, etc.), and generate an output that characterizes the way the data is organized. This may involve organizing input data into clusters and/or identifying outliers. Unsupervised learning models include, for example, K-Means, Mean-Shift, density-based spatial clustering applications with noise (DBSCAN), Fuzzy C-Means, or Isolation Forests.

In some embodiments, the AI model is a local DNN module 158. The local DNN module 158 may be smaller or otherwise less complex than a cloud-based DNN module 116. The local DNN module 158 is configured to generate an initial response to user input while the remotely executing DNN module 116 generates the primary response. The client application 154 may combine the initial response with the primary response while the initial response is outputted to the user. This may involve playing back a first audio clip corresponding to the initial response. Further, during this playback, the client application 154 may append a second audio clip corresponding to the primary response to the first audio clip so that the user hears a continuous audio output played by the speaker 148. Moreover, by immediately playing back the first audio clip, the latency perceived by the user is significantly minimized.

The local DNN module 158 may be configured to apply speech-to-text and other processing of an audio input signal. The local DNN module 158 may include a hybrid of different neural networks such as, for example, a Recurrent Neural Network (RNN) and a Convolutional Neural Network (CNN). In addition, the local DNN module 158 may include a classifier. The local DNN module 158 may be trained according to a dictionary to recognize speech.

The audio clip library 156 may store one or more audio clips. The audio clips may be indexed for quick identification and access by the client application 154. The audio clips stored in the audio clip library 156 may be used to generate initial responses to user input while a cloud service is generating the primary response.

Figure 2:
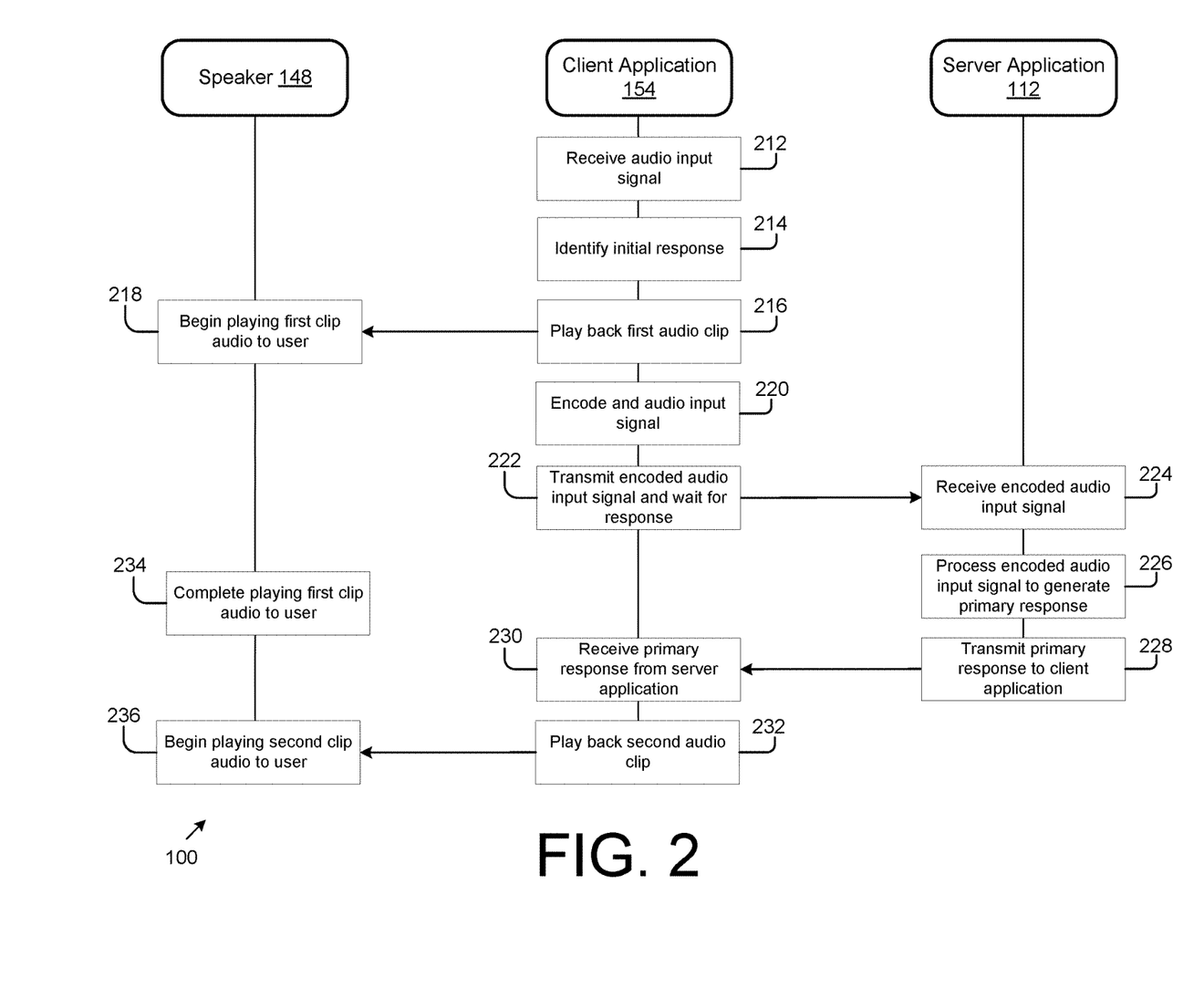
FIG. 2 is a timing diagram showing the communication of some components within a networked environment according to various embodiments.

FIG. 2 is a timing diagram showing the communication of some components within a networked environment according to various embodiments. Specifically, FIG. 2 shows the communication that takes place between the client application 154 executing on a local device (e.g., the client device 140) and a server application 112 executing on a remote device (e.g., the computing system 110). This communication may be structured as Internet Protocol (IP) packets transmitted over the network 130. In addition, the communication may use HTTP or other web-based communication protocols. In addition, FIG. 2 shows the client application 154 communicating with the speaker 148 to playback audio via the speaker 148. The client application 154 may communicate with the speaker 148 via a local bus within the client device 140.

At item 212, the client application 154 receives an audio input signal. The audio input signal includes a request provided by the user. For example, the user speaking into a microphone 146 may have the speech-based request formatted as an audio input signal. The audio input signal may be described as raw data that represents captured acoustic data of a user speaking. While FIG. 2 shows an audio input signal, the present disclosure is not limited to audio input signals. Other user input such as, for example, text-based input may be received and processed by the client application 154.

At item 214, the client application 154 identifies an initial response. There are different embodiments regarding the way the client application 154 identifies the initial response. These are discussed in greater detail with respect to FIGS. 3-5. The initial response may be referred to as "initial" because it is provided to the user before a cloud-generated primary response.

At item 216, the client application 154 plays back a first audio clip associated with the initial response. In this respect, the initial response corresponds to the first audio clip. The first audio clip may be identified or otherwise generated locally within the client device 140. The client application 154 may generate a playback instruction that causes the first audio clip to be played by the speaker 148. The playback instruction may include a command handled by a device driver or operating system service that allows the client application 154 to send audio output signals to the speaker 148.

At item 218, the speaker 148 begins playing the first audio clip. The speaker output may be controlled by the client device's 140 operating system or other device service of the client device 140.

At item 220 the client application 154 encodes the received audio input signal for communication over the network 130. For example, the client application 154 may format the audio input signal has a payload according to a predetermined communication protocol. The communication protocol may be established between the client application 154 and the server application 112. For example, the communication may allow the client application 154 to submit commands to the server application 112. The command may include, as a payload, the audio input signal.

At item 222, the client application 154 transmits the encoded audio input signal to the server application 112. For example, the client application 154 may request the client device to packetize the encoded audio input signal and transmit it over the network 130. The client application 154 may then wait for a response from the server application 112.

At item 224, the server application 112 receives the encoded audio input signal. At item 226, the server application 112 processes the encoded audio input signal to generate a primary response. For example, the server application 112 may use a speech-to-text operation to convert the encoded audio input signal into textual data. The server application 112 may use a remotely executing DNN module 116 to convert the encoded audio input signal into text and analyze the text. The server application 112 may use the text to submit a query to generate a primary response.

At item 228, the server application 112 transmits the primary response to the client application 154. The primary response may be formatted according to an established communication protocol. The primary response includes at least the query results performed by the server application 112.

At item 230, the client application 154 receives the primary response from the server application 112. The client application 154 identifies the second audio clip based on the primary response. The second audio clip may be an audio file that expresses the substance of the primary response. For example, if the primary response included information about the score of a football game, the second audio clip may include audio data that conveys the score. In some embodiments, the primary response includes the second audio clip. In other embodiments, the primary response includes data that allows the client application 154 to generate a second audio clip using the data. For example, the data included in the primary response may include a text string. The client application 154 may generate the second audio clip by converting the text string to audio data using a text-to-speech converter. Thus, in some embodiments, the second audio clip is generated from the primary response or it is included in the primary response.

Throughout the cloud-based process discussed above, the first audio clip may be played by the speaker 148 which began playing at item 218. At item 232 the client application 154 plays back the second audio clip. The client application 154 appends the second audio clip to the first audio clip so that the second audio clip plays back upon the completion of the playing back of the first audio clip. This may involve adding the second audio clip in a playback memory buffer so that the client device 140 plays the second audio clip immediately upon completing the playback of the first audio clip. The client application 154 may communicate with the operating system of the client device to seamlessly stitch together the second audio clip to the end of a currently playing first audio clip. The operating system may manage a queue or other memory buffer to coordinate the play back of audio clips.

At item 234, the speaker 148 eventually completes playing back the first audio clip. This may occur after item 232 or at other preceding events. Upon completion, the speaker begins playing the second audio clip at 236. From the user's perspective, the playback of the first audio clip and second audio clip is continuous for seamless listening.

Figure 3:
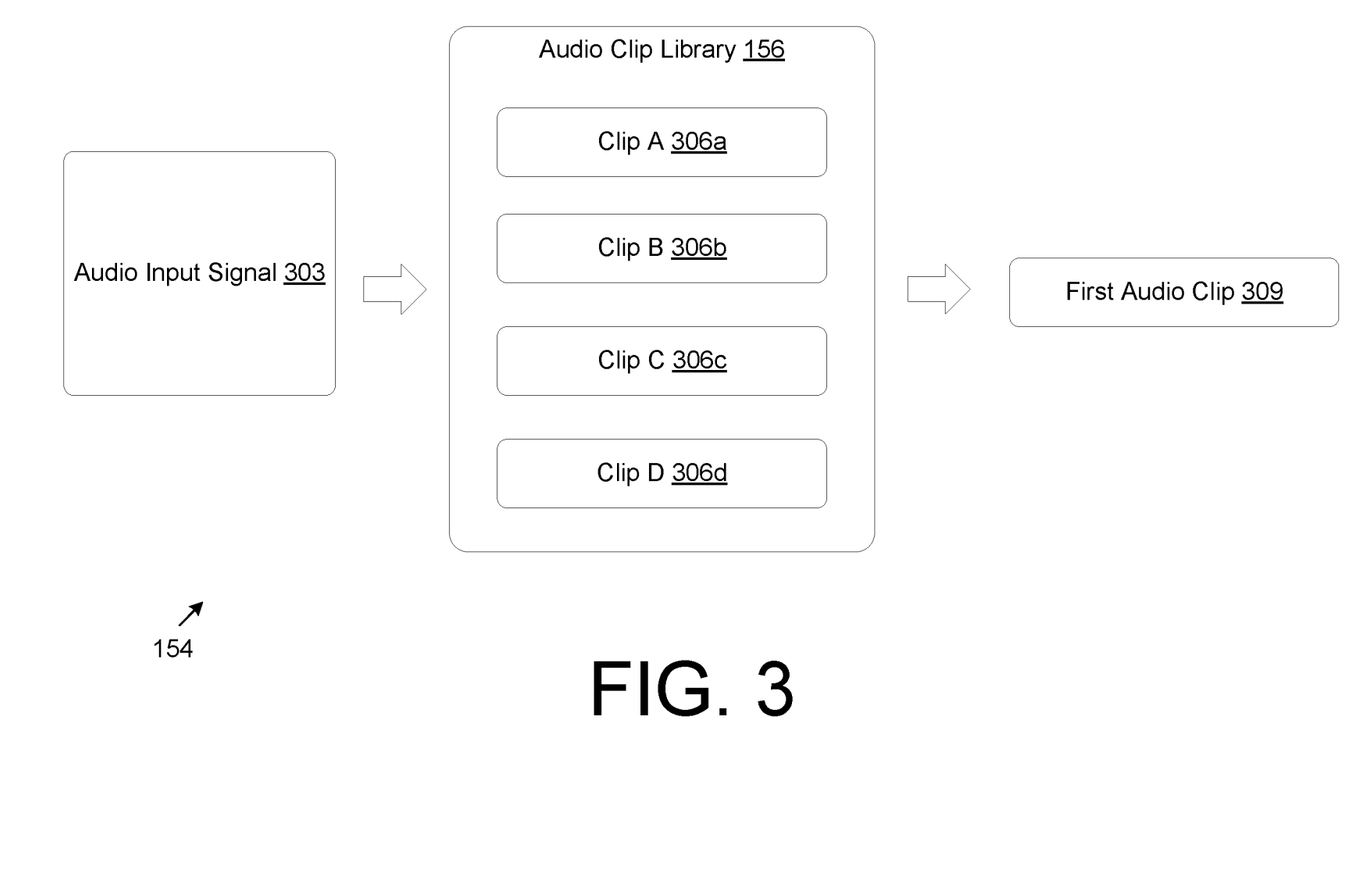
FIG. 3 is a drawing that illustrates a process of locally selecting a predefined initial response according to various embodiments.

FIG. 3 is a drawing that illustrates a process of locally selecting a predefined initial response according to various embodiments. FIG. 3 illustrates an embodiment where the client application 154 does not employ or use artificial intelligence (e.g., a local DNN module 158). In this embodiment, a user speaks into the microphone 146 to provide a request. The request is received by the client application 154 as an audio input signal 303 containing the substance of the request. To provide an example, the request may be a verbal question of "what is twelve plus twelve?" The client application 154 determines an initial response that is a boilerplate response. This does not make use of artificial intelligence (e.g., a DNN algorithm). The client application 154 may select an audio clip 306a-d from the audio clip library 156. The audio clip library may include one or more predetermined clips. In some embodiments, a single clip is always used. In other embodiments, the client application 154 randomly selects one audio clip 306a-d using, for example, a random number generator. The client application 154 may sequentially select one of the audio clip 306a-d. The selected audio clip 306a-d is referred to as the first audio clip 309. The client application 154 may immediately play back the first audio clip 309.

An audio clip 306a-d, which is selected as the first audio clip 309, may include a voice that provides a boilerplate preamble such as, for example, "the answer is." The first audio clip 309 plays back while the primary response is obtained from the cloud service. In this respect, the audio clip 306a-d is a predetermined audio clip that is stored in the memory 150 prior to the audio input signal 303 being received from the microphone. It is predetermined in the sense that the client application 154 determines that it will play back the audio clip 306a-d as the first audio clip 309 before it receives the audio input signal 303.

Figure 4:
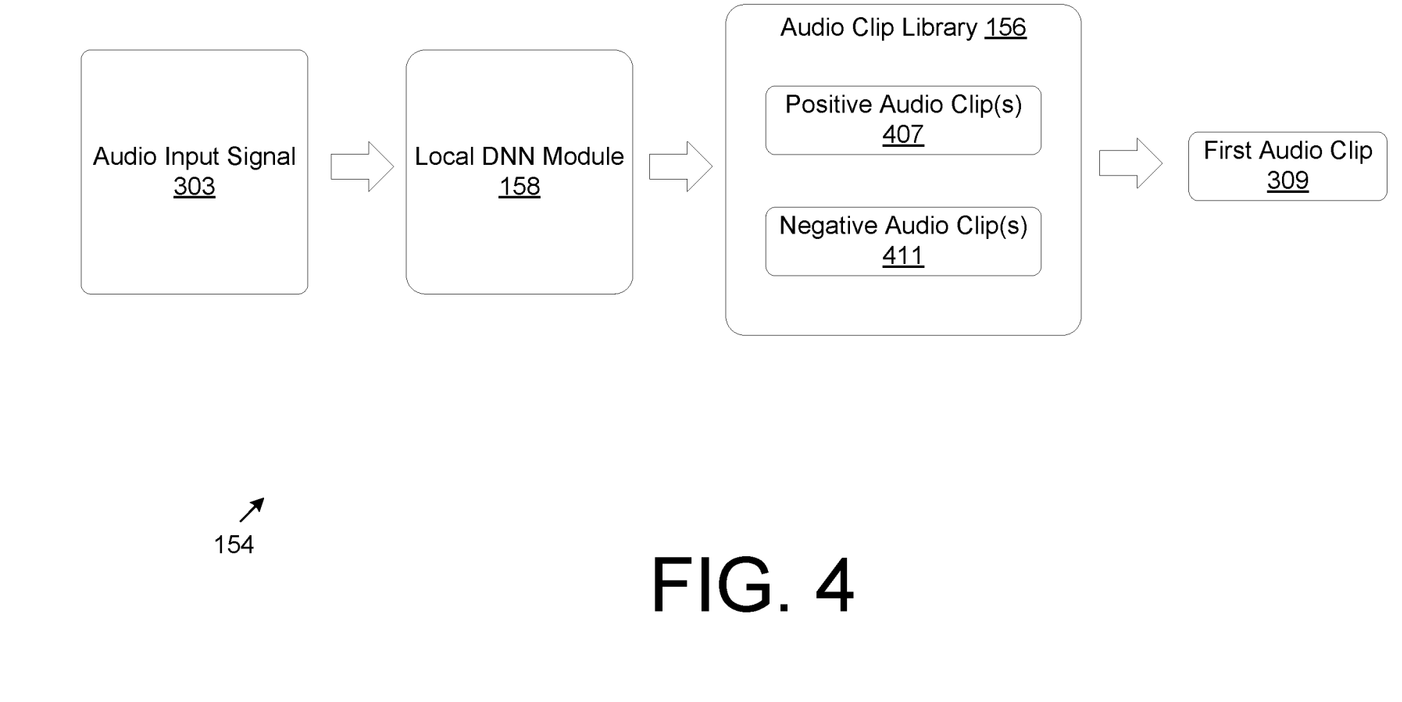
FIG. 4 is a drawing that illustrates locally identifying a directional marker as an initial response according to various embodiments.

FIG. 4 is a drawing that illustrates locally identifying a directional marker as an initial response according to various embodiments. FIG. 4 illustrates an embodiment where the client application 154 includes an artificial intelligence module (e.g., a local DNN module 158). In this example, a user speaks into the microphone 146 to input a request. The request is received by the client application 154 as an audio input signal containing the substance of the request. To provide an example, the request may be a verbal question of "what is twelve plus twelve?" The client application 154 determines an initial response that is a directional result. A directional result may be a positive response such as, for example, "I can help you with that." A directional result may also be a negative response such as, for example, "I don't know how to answer that." In other words, the initial response, in this embodiment, informs the user whether a primary response is available or otherwise capable of being generated.

The local DNN module 158 may be trained or otherwise configured to interpret or analyze the audio input signal to determine whether the cloud service (e.g., the server application 112 working in conjunction with the speech processing module 114) is capable of generating a primary response. For example, the cloud service may be limited to answering questions about the weather, news, and sports. In this respect, the cloud service may generate a primary response for questions related to these topics. However, questions about other topics such as, for example, the type of software capabilities of the client device 140 may be unanswerable by the cloud service. The local DNN module 158 may classify or otherwise categories the audio input signal to determine whether the cloud service is capable of answering the question presented in audio input signal. The local DNN module 158 executes locally and separately from the cloud service but is trained or configured to recognize the cloud service's capabilities.

After the local DNN module 158 determines whether the audio input signal includes a request that can be responded to by the cloud service, the client application 154 selects an appropriate audio clip from the audio clip library. For example, if the directional result is positive (e.g., a primary response can be generated by the cloud service), then one positive audio clip 407 may be selected as the first audio clip 309. If the directional result is negative (e.g., a primary response cannot be generated by the cloud service), then one negative audio clip 411 may be selected as the first audio clip 309. There may be multiple positive audio clips 407 and/or multiple negative audio clips 411 to choose from. In some embodiments, there is only one positive audio clip 407 and one negative audio clip 411. In other embodiments, the client application 154 randomly selects an audio clip using, for example, a random number generator. The client application 154 may sequentially select the audio clip depending on the determined directional marker.

While the direction may be a binary result such as positive or negative, the direction may also include other options. For example, if the local DNN module 158 is unable to determine whether the cloud service can or cannot provide a primary response, the client application 154 may playback a neutral audio clip stating, for example, "let me look into that." Thus, in some embodiments, the local DNN module 158 provides a binary direction result while in other embodiments, it provides additional results corresponding to the direction of the answer.

Figure 5:
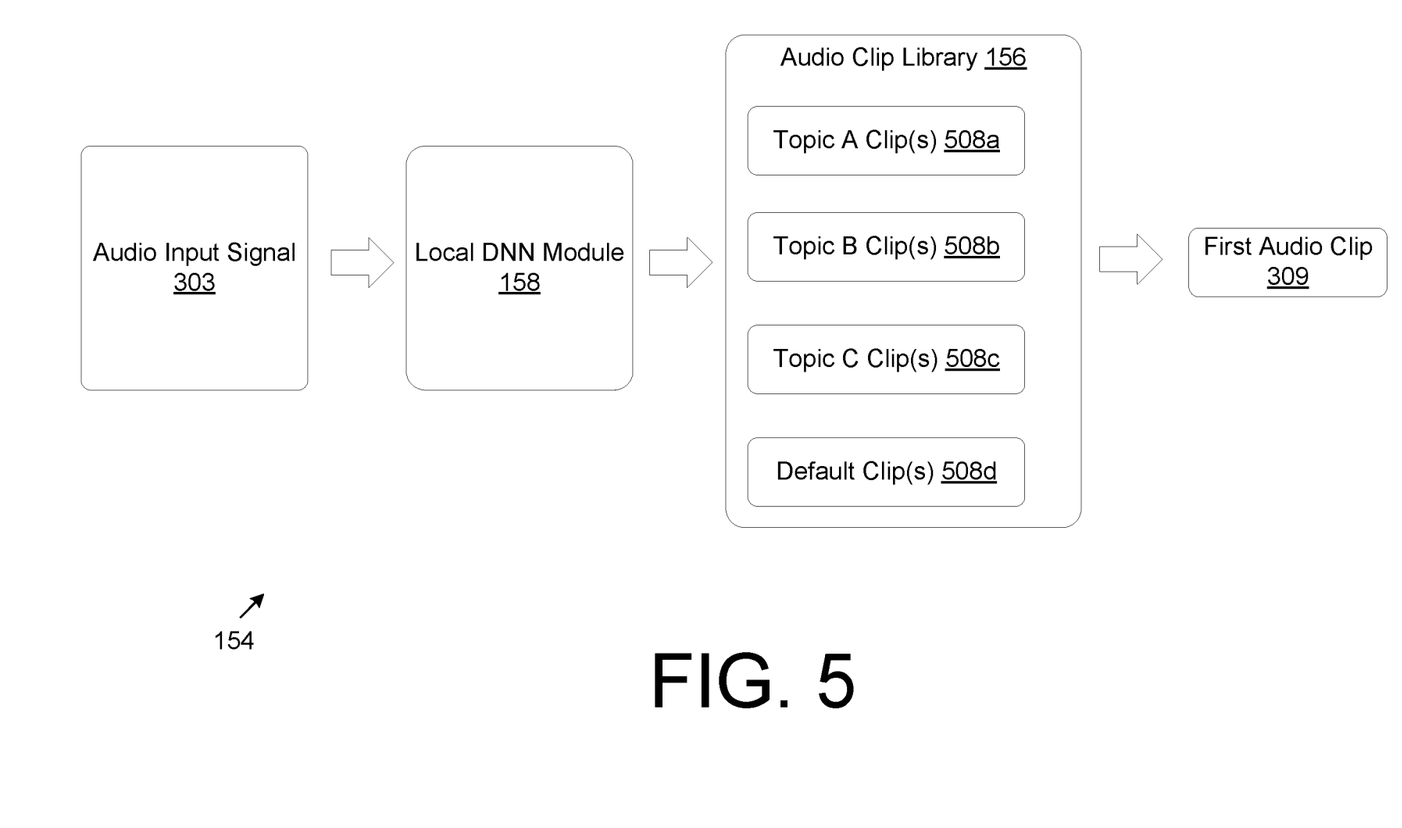
FIG. 5 is a drawing that illustrates locally identifying a topic to generate an initial response according to various embodiments.

FIG. 5 is a drawing that illustrates locally identifying a topic to generate an initial response according to various embodiments. FIG. 5 illustrates an embodiment where the client application 154 includes an artificial intelligence module (e.g., a local DNN module 158). In this example, a user speaks into the microphone 146 to input a request. The request is received by the client application 154 as an audio input signal containing the substance of the request. To provide an example, the request may be a verbal question of "how is the weather today?" The client application 154 determines an initial response based on categorizing the topic of the question in the request. An initial response, in this embodiment, is based on the identified topic. For example, the initial response may be, "The weather is." The initial response includes the context, category, or topic of the question to give the user the impression that the initial response is specific and responsive to the question presented in the audio input signal.

The local DNN module 158 may be trained or otherwise configured to interpret or analyze the audio input signal to determine the topic expressed in the user-submitted request. The local DNN module 158 may be trained to convert the audio input signal from speech to text and then analyze the text for determining a topic. The local DNN module 158 may be configured to classify or categorize the audio input signal into one topic among a set of predefined topics (e.g., Topic A, Topic B, Topic C, etc). After determining the topic, the client application 154 may select an audio clip 508*a-c* that corresponds to the identified topic, where the selected audio clip is handled as the first audio clip 309. If a topic is not able to be identified, a default audio clip 508*d* may be selected. In some embodiments, each topic corresponds to a respective, single audio clip. In other embodiments, the client application 154 randomly selects an audio clip using, for example, a random number generator for a given topic. The client application 154 may sequentially select the audio clip for a given topic. For example, if the topic is determined to be "sports," this topic may have several corresponding audio clips such as, for example, "the score is," "the winner is," "the score of the game is," etc. These different audio clips may be randomly or sequentially selected for each request that is determined to be associated with the topic of "sports."

Figure 6:
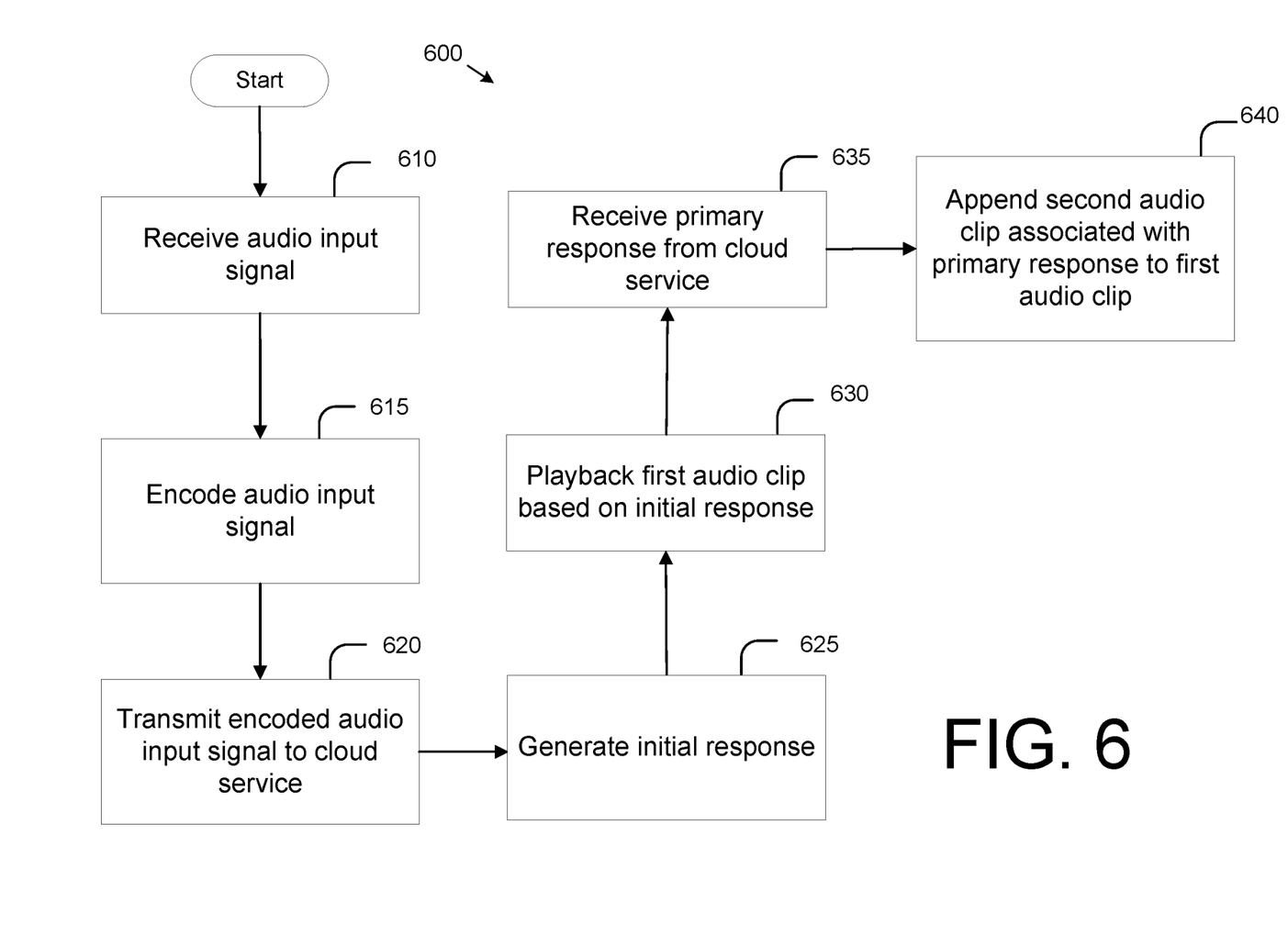
FIG. 6 is a flowchart illustrating an example of the functionality of a client application according to various embodiments.

FIG. 6 is a flowchart illustrating an example of the functionality of the client application 154 according to various embodiments. It is understood that the flowchart of FIG. 6 provides an illustrative example of the many different types of functional arrangements that may be employed to implement the operation of the portion of a client device 140 as described herein. The flowchart of FIG. 6 may also be viewed as depicting an example of a method 600 implemented in the networked environment 100 of FIG. 1 according to one or more embodiments.

At item 610, the client application 154 receives an audio input signal. The audio input signal includes a user-submitted request provided via a microphone 146 as speech.

At item 615, the client application 154 encodes the audio input signal. For example, the client application 154 may format the audio input signal as a payload that is part of a web-based command to be transmitted to a cloud service. The client application 154 may include the audio input signal with other parameters and/or a function call to be handled by a cloud service.

At item 620, the client application 154 transmits the encoded audio input signal to a cloud service (e.g., a remote server application). The client application 154 may use the resources of a client device 140 to cause the encoded audio input signal to be transmitted. For example, the client application 154 may use a network interface 142 to transmit the encoded audio input signal to the cloud service.

At item 625, the client application 154 generates an initial response. The initial response may be generated immediately after receiving the audio input signal (e.g., at item 610) or in parallel with the functionality described in items 615-620. The generation of the initial response may involve identifying a boilerplate audio clip (e.g., as discussed with respect to FIG. 3), the generation of a directional result and corresponding audio clip (e.g., as discussed with respect to FIG. 4), identifying a topic and corresponding audio clip (e.g., as discussed with respect to FIG. 5), or identifying any other initial response. The generation of the initial response occurs locally by the client device 140 without using a remote server.

At item 630, the client application 154 plays back the first audio clip based on the initial response. As mentioned above, the initial response corresponds to a first audio clip 309 that forms the beginning portion of the response to the request contained in the audio input signal.

At item 635, the client application 154 receives a primary response from the cloud server. The primary response may be a substantive response containing complete information that responds to the request contained in the audio input signal. This primary response is received after the playback of the first audio clip 309 begins. The client application 154 may receive the primary response via the network interface 142 of the client device 140. In some embodiments, the primary response includes a second audio clip. In other embodiments, the primary response includes information that allows the client application 154 to generate the second audio clip. For example, the primary response may include a text string containing the substantive information to respond to the request. The client application 154 may include a text to speech module for converting the text in the primary response to the second audio clip.

At item 640 the client application 154 appends the second audio clip that is associated with the primary response to the first audio clip. For example, the client application 154 may add the second audio clip to a queue or memory buffer so that the second audio clip plays immediately after the first audio clip completes playback to provide seamless playback from the user's perspective. In this respect, the client application 154 appends the second audio clip to a currently playing first audio clip.

Figure 7:
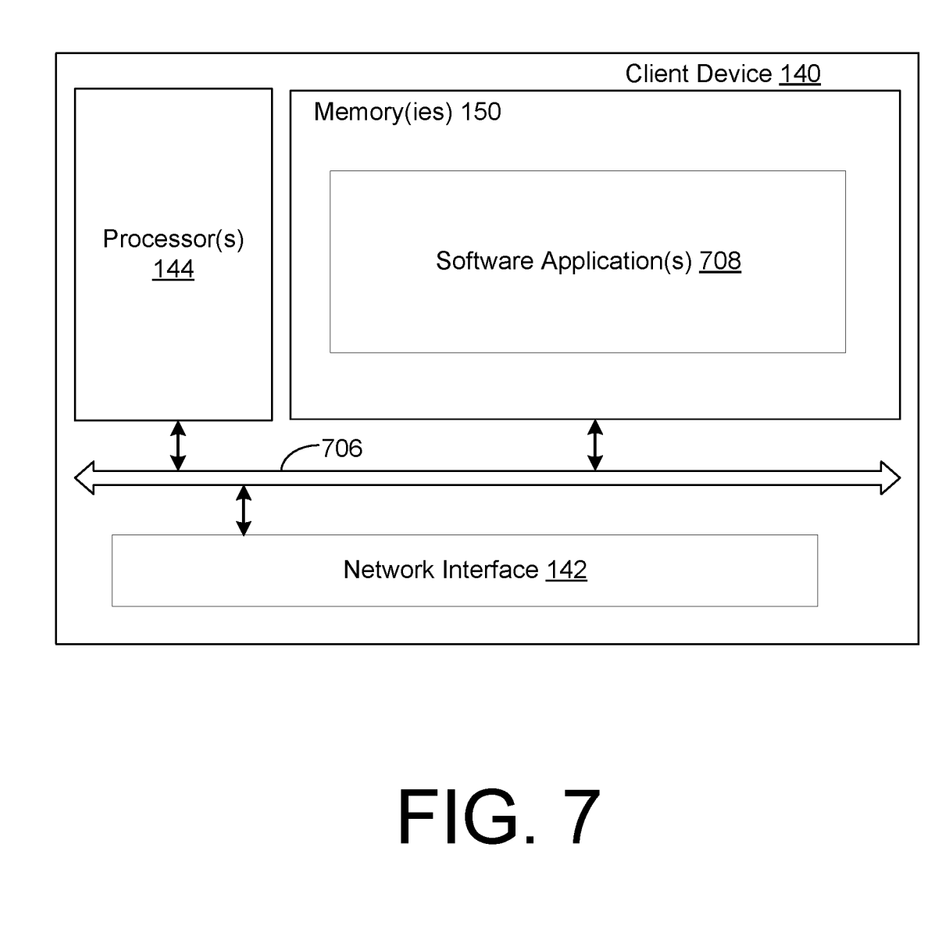
FIG. 7 is a schematic showing an example of an implementation of various embodiments in a client device.

FIG. 7 is a schematic showing an example of an implementation of various embodiments in a client device 140. The client device 140 may include at least one processor circuit, for example, having a processor 144 and memory 150, both of which are coupled to a local interface 706 or bus. Stored in the memory 150 are both data and several components that are executable by the processor 144. For example, the memory 150 may store a combination of data (e.g., files, information, etc.) and executable code (e.g., an operation system, firmware, user-level applications, services, etc.). Also stored in the memory 150 and executable by the processor 144 is the client application 154. The client application 154 may embody the functionality described in FIGS. 2-6.

It is understood that there may be other applications that are stored in the memory 150 and are executable by the processor 144 as can be appreciated. Where any component discussed herein is implemented in the form of software, any one of a number of programming languages may be employed, such as, for example, C, C++, C#, Objective C, Java®, JavaScript®, Perl, PHP, Visual Basic®, Python®, Ruby, or other programming languages.

Several software components are stored in the memory 150 and are executable by the processor 144. In this respect, the term "executable" means a program file that is in a form that can ultimately be run by the processor 144. Examples of executable programs may be, for example, a compiled program that can be translated into machine code in a format that can be loaded into a random access portion of the memory 150 and run by the processor 144, source code that may be expressed in proper format such as object code that is capable of being loaded into a random access portion of the memory 150 and executed by the processor 144, or source code that may be interpreted by another executable program to generate instructions in a random access portion of the memory 150 to be executed by the processor 144, etc. An executable program may be stored in any portion or component of the memory 150 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 150 is defined herein as including both volatile and nonvolatile memory and data storage components. Volatile components are those that do not retain data values upon loss of power. Nonvolatile components are those that retain data upon a loss of power. Thus, the memory 150 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 144 may represent multiple processors 144 and/or multiple processor cores and the memory 150 may represent multiple memories 150 that operate in parallel processing circuits, respectively. In such a case, the local interface 706 may be an appropriate network that facilitates communication between any two of the multiple processors 144, between any processor 144 and any of the memories 150, or between any two of the memories 150, etc. The local interface 706 may couple to additional systems such as the network interface 142 to coordinate communication with remote systems.

Although components described herein may be embodied in software or code executed by hardware as discussed above, as an alternative, the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc.

The flowchart discussed above show the functionality and operation of an implementation of components within a system such as a software application 708 or other software. If embodied in software, each box may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system, such as a processor 144 in a computer system or other system. The machine code may be converted from the source code, etc. If embodied in hardware, each block may represent a circuit or a number of interconnected circuits to implement the specified logical function(s).

Although the flowchart shows a specific order of execution, it is understood that the order of execution may differ from that which is depicted. For example, the order of execution of two or more boxes may be scrambled relative to the order shown. Also, two or more boxes shown in succession may be executed concurrently or with partial concurrence. Further, in some embodiments, one or more of the boxes may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

The components carrying out the operations of the flowchart may also comprise software or code that can be embodied in any non-transitory computer-readable medium for use by or in connection with an instruction execution system such as, for example, a processor 144 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any program or application described herein, including the software application 708, may be implemented and structured in a variety of ways. For example, one or more applications described may be implemented as modules or components of a single application. Further, one or more applications described herein may be executed in shared or separate computing devices or a combination thereof. Additionally, it is understood that terms such as "application," "service," "system," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

What is claimed is:

1. A system comprising:
a processor of a client mobile device;
a memory of the client device, the memory configured to store a plurality of instructions, which, when executed, cause the processor to:
encode an audio input signal received from a microphone of the client mobile device, the audio input signal comprising a request;
transmit the encoded audio input signal to a cloud service that is configured to generate a primary response;
determine an initial response to the request, the initial response corresponding to a first audio clip, wherein the first audio clip is a predetermined audio clip that is stored in the memory prior to the audio input signal being received from the microphone, wherein the initial response to the request is determined by applying a Deep Neural Network (DNN) algorithm to the audio input signal to generate the initial response, wherein the DNN algorithm is configured to categorize the audio input signal into a directional result, the directional result indicating whether the cloud service is able to respond to the request, and wherein the initial response is determined according to the directional result;
render the first audio clip for presentation via a speaker of the client mobile device prior to receiving the primary response from the cloud service, the primary response corresponding to a second audio clip; and
append the second audio clip to follow the first audio clip, the second audio clip being presented after the presentation of the first audio clip.

2. The system of claim 1, wherein the first audio clip is randomly selected from a library of predetermined audio clips stored in the memory.

3. The system of claim 1, wherein the DNN algorithm is configured to identify a topic associated with the audio input signal, wherein the plurality of instructions, which, when executed, further cause the processor to identify the initial response based on the identified topic.

4. The system of claim 1, wherein the plurality of instructions, which, when executed, further cause the processor to generate the second audio clip from the primary response.

5. A client device comprising:
a memory configured to store a local application; and
a processor coupled to the memory configured to execute the local application, the processor configured to;
encode an input signal received at the client device via an audio interface of the client device, the input signal comprising a request;
transmit the encoded input signal to a cloud service that is configured to generate a primary response;
determine an initial response to the request at the client device, the initial response corresponding to a first audio clip, wherein the first audio clip is a predetermined audio clip that is stored in the memory prior to the audio input signal being received, wherein the initial response to the request is determined by applying an artificial intelligence algorithm to the input signal to generate the initial response, wherein the artificial intelligence algorithm is configured to categorize the input signal into a binary result, the binary result indicating whether the cloud service is able to respond to the request, and wherein the initial response is determined according to the binary result;

rendering the first audio clip for presentation;

receive the primary response from the cloud server, the primary response corresponding to a second audio clip;

append the second audio clip to the first audio clip during presentation of the first audio clip.

6. The client device of claim 5, wherein the first audio clip is a predetermined audio clip that is stored in the memory prior to the input signal being received at the client device.

7. The client device of claim 5, wherein the first audio clip is selected from a library of predetermined audio clips stored in the memory.

8. The client device of claim 5, wherein the artificial intelligence algorithm is configured to identify a topic associated with the input signal, wherein the plurality of instructions, which, when executed, further cause the processor to identify the initial response based on the identified topic.

9. The client device of claim 5, wherein the second audio clip is received from the cloud service as part of the primary response.

10. A method comprising:

encoding, by a local device, an audio input signal received from a microphone physically coupled to the local device, the audio input signal comprising a request;

transmitting, by the local device, the encoded audio input signal to a remote service that is configured to generate a primary response;

categorizing, by the local device, the audio input signal into a directional result, the directional result indicating whether the remote service is able to respond to the request;

generating, by the local device, an initial response to the request, the initial response corresponding to a first audio clip, wherein the first audio clip is a predetermined audio clip that is stored in a memory of the local device prior to the audio input signal being received from the microphone, and wherein the initial response is generated according to the directional result;

rendering, by the local device, the first audio clip for presentation prior to receiving the primary response, the primary response corresponding to a second audio clip; and rendering, by the local device, the second audio clip for presentation to follow the presentation of the first audio clip.

11. The method of claim 10, further comprising:

identifying, by the local device, a topic associated with the audio input signal; and identify, by the local device, the initial response based on the identified topic.

12. The method of claim 10, wherein the local device comprises a locally executed artificial intelligence module configured to generate the initial response.

13. The method of claim 10, further comprising generating, by the local device, the second audio clip from the primary response.

14. The method of claim 10, further comprising generating the initial response to the request by applying a Deep Neural Network (DNN) algorithm to the audio input signal to generate the initial response.

* * * * *